(12) United States Patent
Sivaraj et al.

(10) Patent No.: US 11,533,524 B2
(45) Date of Patent: *Dec. 20, 2022

(54) METHODS TO ESTIMATE VIDEO PLAYBACK BUFFER

(71) Applicant: AT&T Intellectual Property I, L.P., Atlanta, GA (US)

(72) Inventors: Rajarajan Sivaraj, Belmont, CA (US); Zhengye Liu, Pleasanton, CA (US); Jin Wang, Fremont, CA (US); Yali Liu, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,302

(22) Filed: Aug. 3, 2021

(65) Prior Publication Data

US 2021/0368216 A1 Nov. 25, 2021

Related U.S. Application Data

(63) Continuation of application No. 16/814,451, filed on Mar. 10, 2020, now Pat. No. 11,109,079, which is a
(Continued)

(51) Int. Cl.
*H04N 21/238* (2011.01)
*H04N 21/24* (2011.01)
(Continued)

(52) U.S. Cl.
CPC ......... *H04N 21/238* (2013.01); *H04L 47/193* (2013.01); *H04N 21/2401* (2013.01);
(Continued)

(58) Field of Classification Search
CPC ............. H04N 21/238; H04N 21/2402; H04N 21/44004; H04N 21/2401; H04L 47/193; H04L 65/80
See application file for complete search history.

(56) References Cited

U.S. PATENT DOCUMENTS 5,961,603 A 10/1999 Kunkel et al.
7,032,238 B2 4/2006 Booth et al.
(Continued)

FOREIGN PATENT DOCUMENTS

WO 02052427 A1 7/2002
WO 2013029214 A1 3/2013
(Continued)

OTHER PUBLICATIONS

Krishnamoorthi et al., "BUFFEST: Predicting Bufer Conditions and Real-time Requirements of HTTP(S) Adaptive Streaming Clients", 2017, 12 pages.
(Continued)

*Primary Examiner* — Shawn S An
(74) *Attorney, Agent, or Firm* — Guntin & Gust, PLC; John G. Rauch

(57) ABSTRACT

Aspects of the subject disclosure may include, for example, a method including monitoring a video session to determine key performance indicators for cross-layer interactions between a network providing video session video data and user equipment receiving the video session video data, wherein the key performance indicators include a transmission control protocol congestion window size that corresponds to a video chunk requested by the user equipment, and a radio access network throughput of a download of the video chunk requested by the user equipment, and determining a quality of service for the user equipment during the video session according to a residual length of content in a playback buffer for the user equipment based on the transmission control protocol congestion window size, and radio access network throughput. Other embodiments are disclosed.

20 Claims, 7 Drawing Sheets

Related U.S. Application Data continuation of application No. 15/934,077, filed on Mar. 23, 2018, now Pat. No. 10,623,788.

(51) Int. Cl.
  *H04N 21/44* (2011.01)
  *H04L 47/193* (2022.01)
  *H04L 65/80* (2022.01)

(52) U.S. Cl.
  CPC ... *H04N 21/2402* (2013.01); *H04N 21/44004* (2013.01); *H04L 65/80* (2013.01)

(56) References Cited

U.S. PATENT DOCUMENTS

| | | | |
|---|---|---|---|
| 7,652,994 | B2 | 1/2010 | Van et al. |
| 7,822,011 | B2 | 10/2010 | Le-Faucheur et al. |
| 8,004,981 | B2 | 8/2011 | Bergamasco et al. |
| 8,495,237 | B1 | 7/2013 | Bilinski et al. |
| 8,660,191 | B2 | 2/2014 | Wang et al. |
| 8,824,546 | B2 | 9/2014 | Coulombe et al. |
| 8,923,270 | B2 | 12/2014 | Lee et al. |
| 9,178,633 | B2 | 11/2015 | Kordasiewicz et al. |
| 9,204,203 | B2 | 12/2015 | Brockmann et al. |
| 9,344,533 | B2 | 5/2016 | Weston et al. |
| 9,485,298 | B2 | 11/2016 | Joch et al. |
| 9,787,735 | B2 * | 10/2017 | Ziskin ................ H04L 65/60 |
| 9,838,288 | B2 | 12/2017 | Frett et al. |
| 10,623,788 | B2 * | 4/2020 | Sivaraj ............ H04N 21/2402 |
| 11,109,079 | B2 * | 8/2021 | Sivaraj ............ H04N 21/4782 |
| 2007/0220577 | A1 * | 9/2007 | Kongalath ......... H04L 65/4084 348/E7.071 |
| 2010/0150525 | A1 * | 6/2010 | Walker ............ H04N 21/47202 386/E5.003 |
| 2012/0317197 | A1 * | 12/2012 | De Foy ............. H04L 67/1063 709/204 |
| 2013/0103849 | A1 | 4/2013 | Mao et al. |
| 2014/0012981 | A1 * | 1/2014 | Samuell ................ H04L 47/40 709/224 |
| 2014/0139687 | A1 * | 5/2014 | Adams ............... H04L 43/0894 348/192 |
| 2015/0049602 | A1 | 2/2015 | Gavita et al. |
| 2015/0215359 | A1 | 7/2015 | Bao et al. |
| 2015/0236966 | A1 | 8/2015 | Francini et al. |
| 2016/0277522 | A1 * | 9/2016 | Singh .................... H04L 65/65 |
| 2016/0366202 | A1 | 12/2016 | Phillips et al. |
| 2017/0111415 | A1 | 4/2017 | Bao et al. |
| 2018/0367844 | A1 | 12/2018 | Fu et al. |
| 2019/0238461 | A1 | 8/2019 | Miller et al. |
| 2019/0297356 | A1 | 9/2019 | Sivaraj et al. |
| 2020/0213636 | A1 | 7/2020 | Sivaraj et al. |

FOREIGN PATENT DOCUMENTS

| | | |
|---|---|---|
| WO | 2014066975 A1 | 5/2014 |
| WO | 2016123721 A1 | 8/2016 |

OTHER PUBLICATIONS

Petrangeli et al., "A machine learning-based framework for preventing video freezes in HTTP adaptive streaming", 2017, 18 pages.
Singh et al., "Predictive Buffering for Streaming Video in 3G Networks", 2012, 10 pages.

* cited by examiner

250

300

400

METHODS TO ESTIMATE VIDEO PLAYBACK BUFFER

CROSS REFERENCE TO RELATED APPLICATIONS

This application is a continuation of U.S. patent application Ser. No. 16/814,451 filed on Mar. 10, 2020, which is a continuation of U.S. patent application Ser. No. 15/934,077 filed on Mar. 23, 2018 (now U.S. Pat. No. 10,623,788). All sections of the aforementioned application(s) and patent(s) are incorporated herein by reference in their entirety.

FIELD OF THE DISCLOSURE

The subject disclosure relates to methods and systems for estimating a video playback buffer state for user equipment by a service provider.

BACKGROUND

Media devices may experience buffering when playing streamed video content if the amount of video data being added to video data storage cannot meet a rate at which the device consumes the video data while playing the streamed video content. The user equipment cannot account for the bottlenecks on the network side, such as queuing congestion, in selecting bit-rates to solve buffering problems.

BRIEF DESCRIPTION OF THE DRAWINGS

Reference will now be made to the accompanying drawings, which are not necessarily drawn to scale, and wherein.

DETAILED DESCRIPTION

Figure 1:
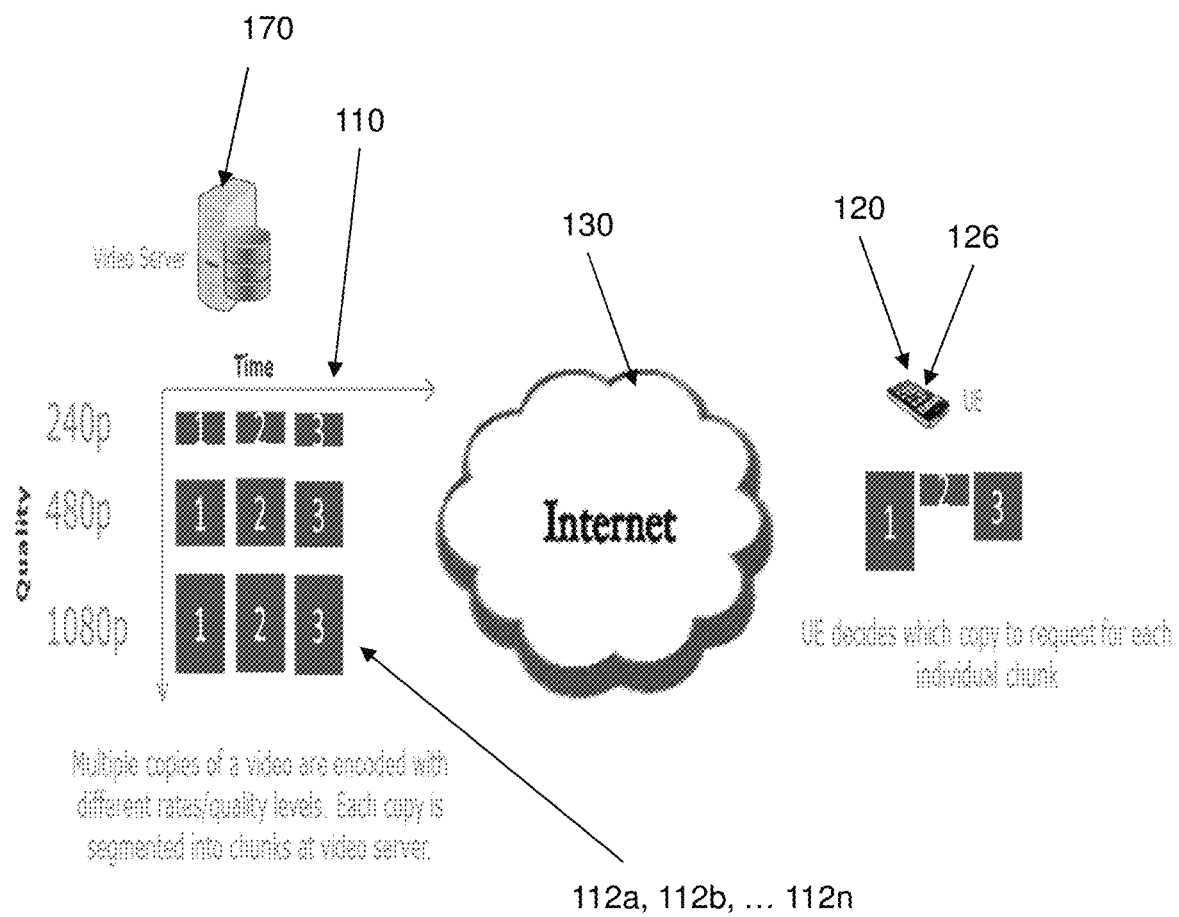
FIG. 1 depicts an illustrative embodiment of network system 100.

The subject disclosure describes, among other things, illustrative embodiments for server-side monitoring and optimization of video delivery to user equipment. Other embodiments are described in the subject disclosure.

One or more aspects of the subject disclosure include a method including monitoring an over-the-top video session to determine key performance indicators for cross-layer interactions between a network providing over-the-top video session video data and user equipment receiving the over-the-top video session video data, wherein the key performance indicators include a requested quality for a video chunk requested by the user equipment, a transmission control protocol congestion window size that corresponds to the video chunk requested by the user equipment, and an instantaneous radio access network throughput while downloading the video chunk requested by the user equipment, and determining a quality of service for the user equipment during the over-the-top video session according to a determined residual length of content in a playback buffer for the user equipment based on the requested quality for the video chunk requested by the user equipment, the transmission control protocol congestion window size, and the instantaneous radio access network throughput.

One or more aspects of the subject disclosure include a machine-readable storage medium, including executable instructions that, when executed by a processing system including a processor, facilitate performance of operations that include initiating a video session responsive to receiving a request for the video session from user equipment, collecting video session data for the video session with the user equipment to determine key performance indicators for cross-layer interactions with the user equipment, wherein the key performance indicators include a requested quality for a video chunk requested by the user equipment, a transmission control protocol congestion window size that corresponds to the video chunk requested by the user equipment, and an instantaneous radio access network throughput while downloading the video chunk requested by the user equipment, and determining a quality of service for the user equipment during the video session according to a determined residual length of content in a playback buffer for the user equipment based on the requested quality for the video chunk requested by the user equipment, the transmission control protocol congestion window size, and the instantaneous radio access network throughput.

One or more aspects of the subject disclosure include a device that includes a processing system including a processor and a memory that stores executable instructions that, when executed by the processing system, facilitate performance of operations that include requesting an on demand video session from a network server, wherein the request includes a requested quality for the on demand video session and initiating playback of video data for the on demand video session responsive to receiving the video data for the on demand video session from the network server, wherein the network server collects key performance indicators for cross-layer interactions for the on demand video session with the device to manage network server performance to prevent a buffering event at the device, wherein the key performance indicators include a transmission control protocol congestion window size that corresponds to a video chunk requested by the device according to the requested quality for the on demand video session, and an instantaneous radio access network throughput while downloading the video chunk requested, and that the network server determines a quality of service for the device during the on demand video session according to an estimated residual length of content in a playback buffer for the device based on the requested quality for the on demand video session, the transmission control protocol congestion window size, and the instantaneous radio access network throughput.

FIG. 1 depicts an illustrative network architecture 100 that conventionally delivers video chunks from a video server 170 to user equipment 120 based on requests from the user equipment 120. Exemplarily, the user equipment 120 may employ one of several video service applications to access and display the video content. Exemplarily, the several video service applications can receive and perform a video-on-demand video session to provide the user equipment 120 with media content. A user, for example, may desire to access several different video service applications to receive different media content that can be available on the different video service.

Different network elements can have different network functionalities. Typically, for example, if a video optimization function is enabled and implemented by an end user device, the end user device is not easily aware of limitations to an access network. This limits a generic and flexible framework for video optimization as a specific network element may change its functionality very quickly during video delivery for the video session. In some instances, the network bandwidth may change, there may be errors to be accounted for, the network path may be suboptimal, or the video content requested may simply be a wrong version. That is, the user device may not efficiently or properly generate a request for video content.

As illustrated in FIG. 1, multiple chunks of media content 110 are created at the video server 170 to provide video data for the different video sessions from the different video service. The video content is divided into the video chunks where each chunk can be of an appropriate length of time. During the playback of the video data, the user equipment 120 can request chunks 112a-112n of the chunks 110 over the Internet 130 to be delivered. The video chunks are exemplarily streamed using Dynamic Adaptive Streaming over HTTP (DASH) based on client requests. Each chunk of video content represents a certain portion of the video content or time slot for the video content. The chunks can be of different video transfer rates and/or video transfer resolutions for a time slot of the video content. As the user equipment 120, or simply UE 120, may conventionally decide on its own as to which chunk to request from the video server 170, the user equipment 120 may not request an appropriate video chunk based on video optimization parameters, network parameters, or based on available video chunk capabilities. Conventional user-side requests are thereby typically made without knowledge of network conditions that can affect video content delivery.

Exemplarily, a server-side monitoring of a buffer in the user equipment can be provided. In some embodiments, provisioning video service over, for example, long term evolution (LTE) networks for over-the-top video streaming services (OTT services) exemplarily requires enhancing a Quality-of-Experience (QoE) for the user equipment 120. In other embodiments, the QoE can be monitored for an on-demand video session and other video sessions. One of the key performance indicators (KPI) for video sessions that affects the user QoE is video buffering. Buffering is the state in which the video player in UE 120 does not have newer video chunks from the subscribed video session available in its playback buffer, even as it continues to stream and attempts to play the video session.

In an exemplary embodiment to enhance QoE for user equipment, the network determines information regarding video buffering events experienced by a UE video player application 126 on the UE 120 in real-time, so that the network can exemplarily optimize video streaming and flow control. In some instances, video buffering can occur during start-up, known as called start-up stall; when the video player application 126 attempts to start playing even before initial video chunks are available in the buffer; and as a video session is being played, exemplarily known as session re-buffering.

Exemplarily, the video server 170 can estimate the video playback buffer size at the UE 120 based on network data to pro-actively detect video buffering events at the UE 120. By detecting likely buffering events at the video server 170, the network can enhance user QoE by optimizing RAN functionalities (such as resource allocation), core network functionalities (such as packet slicing), and bit rate adaptation for streaming video chunks.

Cross-layer characterization of OTT video session stream performance over the LTE network is exemplarily used by the network to identify the key factors across the layers that affect the video playback buffer. Exemplarily, the video playback buffer size is quantified as a function of a resolution of the video chunks requested by the UE 120 using HTTP, instantaneous RAN throughputs while streaming each video chunk, TCP congestion window variations while streaming the chunks, and past-accumulated playback buffer size.

Exemplarily, by having access to video session data sets, network conditions can be predicted from the above identified data sets. Exemplarily, by characterizing the performance of video session streams across all layers and correlating the video KPIs with TCP, IP layer and RAN KPIs by analyzing the inter-dependencies in cross-layer interactions network conditions leading to buffering at the UE 120 can be predicted. Exemplarily, computations based on the video KPIs can be migrated to the network since the network has a global view of the network state due to better access to real-time network KPI data feeds. This also helps the network to effectively optimize the flow of traffic to maximize video QoE by estimating the video playback buffer at the UE 120. The video KPIs further affect management of network state information (such as buffers) and cross-layer network parameters (such as a TCP congestion window), adversely impacting the accuracy of prediction models and hence, the video rate adaptations.

Exemplarily, a cross-layer characterization of, for example, an OTT session stream can be performed across all layers of a TCP/IP protocol stack. Based on this cross-layer characterization, three distinct cross-layer parameters that impact the video playback buffer length for UE 120 during a video session can be identified. These three parameters can predict a buffering event and a duration of the buffering event. Exemplarily, a first parameter can include a requested quality of the video chunks. In some examples, the player can determine a resolution level to be requested for streaming each video chunk. Each chunk can correspond to a certain time duration of the content playtime. This resolution level is based on the estimate of its achieved throughput. Next, TCP congestion window sizes corresponding to each chunk can exemplarily be measured. Each video chunk corresponds to multiple TCP segments, and each segment can be contained in one or more TCP congestion windows. The length of the congestion window is exemplarily the sum of the lengths of the individual TCP segments contained in the window. In some instances, the video server 170 sends the set of TCP segments in the next congestion window upon getting an acknowledgement (ACK) from the UE 120 for the previous TCP segment.

In some instances, each congestion window could vary in size from other congestion windows due to one or more of the following factors: A TCP slow start or an additive increase phase; the TCP receives duplicate ACKs due to packet loss in the network resulting in re-transmissions; a congestion in the network due to buffer overflows at the eNBs resulting in a delayed ACK; and a TCP Receive Window buffer as defined by the UE 120. In its buffers, the LTE eNB queues data from the IP payload data corresponding to the TCP segments contained in the congestion window.

Exemplarily, Instantaneous LTE RAN throughputs while downloading each chunk can be measured. In addition, an instantaneous LTE RAN throughputs can affect the amount of time required to fetch a video chunk (corresponding to a certain length and resolution quality) into the UE's playback buffer in the UE video player application 126 or memory of the UE 120. Next, a past-accumulated video playback buffer size can be defined as a video playback buffer size that is cumulative as the buffer keeps accumulating the newer yet-to-be-played video chunks over time and so, the instantaneous video playback buffer size depends on the accumulated playback buffer size at the previous time instance. Once the video chunk is played by the player, it gets removed from the buffer.

In one embodiment of determining KPI's, let $M_i$ denote the length of the video chunk i in bits. Note that $M_i$ is determined by the resolution of i and its play time. Upon TCP segmentation and windowing, the TCP layer splits $M_i$ bits into $K_i$ congestion windows, such that (as exemplarily illustrated in equation 1):

$$M_i = \sum_{k=1}^{k_i} W_{i,k} \qquad \text{Equation 1}$$

where $W_{i,k}$ is the length (in bits) of the congestion window k of chunk i, where $k \in [1, k_i]$ and $K_i \geq 1$. Note that the PDCP layer in the LTE protocol stack converts the IP packets in the TCP segments of the congestion window to the data PDUs in the eNB buffer. The eNB transmits the data in the buffer over the LTE Radio Access Network (RAN) to the UE 120.

Let $R_{i,k}$ denote the average instantaneous RAN throughput offered by the LTE network in order to transmit the data PDUs corresponding to the TCP congestion window k of the chunk i. Let $t_{i,k}(W_{i,k}, R_{i,k})$ be the time taken to transmit $W_{i,k}$ using rate $R_{i,k}$ to the UE 120. It is exemplarily given by the equation 2:

$$t_{i,k}(W_{i,k}, R_{i,k}) = \begin{cases} \dfrac{W_{i,k}}{R_{i,k}} : \text{ if } \dfrac{W_{i,k}}{R_{i,k}} + \Delta_{i,k} < \Omega \\ \Omega + t_{i,k}(W'_{i,k}, R'_{i,k}) : \text{ otherwise} \end{cases} \qquad \text{Equation 2}$$

Here, $\Delta_{i,k}$ is the time taken for the video server 170 to receive ACK from the UE 120 for the congestion window k of chunk i and $\Omega$ is the constant ACK time-out, the period of lapse in receiving ACK from the UE 120. This indicates that the TCP video server 170 reduces its congestion window to the initial value re-entering the slow start phase, when it has not received ACK from the UE 120 within time $\Omega$ for its previous congestion window. $W'_{i,k}$ is the modified TCP congestion window size for window k of chunk i and $R'_{i,k}$ is the instantaneous average RAN throughput while downloading window k of chunk i in the UE 120 playback buffer. $R'_{i,k}$ need not be equal to $R_{i,k}$. As seen in the above equation, the TCP congestion window recursively loops through the slow start phase until it receives an ACK from the UE 120 within $\Omega$.

Exemplarily, the net time in fetching $K_i$ TCP congestion windows of chunk i in the video playback buffer is given by equation 3:

$$t'_i = \sum_{k=1}^{K_i} (\delta_{i,k} + t_{i,k}(W_{i,k}, R_{i,k}) + \Delta_{i,k}) \qquad \text{Equation 3}$$

Here, $\delta_{i,k}$ is the time delay incurred at the video server 170 in sending congestion window k of chunk i, upon receiving ACK for the previous congestion window k-1. Usually, $\delta_{i,k}$ is a small value. The total time taken to download N video chunks from the time the video server 170 received the HTTP request from the player for the first chunk, is exemplarily given by equation 4:

$$T_N = \sum_{i=1}^{N} (\epsilon_i + t'_i + \gamma_i) \qquad \text{Equation 4}$$

Here, $\gamma_i$ is the time delay incurred in sending the HTTP POST response to the UE 120 upon receiving the ACK for the TCP congestion window $K_i$. $\epsilon_i$ is the time delay incurred in sending the first TCP congestion window segments after sending the HTTP POST response to the UE 120. This delay is caused by TCP segmentation of the video chunk i. In some exemplary instances, $\gamma_i$ and $\epsilon_i$ can be considered as small values.

Exemplarily, for the network to be able to detect video buffering events for the subscribed session in the player, it needs to know the video playtime. The video playtime can either be estimated at the network or reported directly to the network from the UE 120.

In one instance, the network estimates the total time taken by the player to play N video chunks as illustrated in equation 5:

$$C_N = \sum_{i=1}^{N} c_i \qquad \text{Equation 5}$$

Here, $c_i$ is the play-time of the video chunk i (in seconds). If $C_Q \geq T_Q$, it indicates video buffering while playing any video chunk Q. This is because, such a condition indicates that the buffer has run out of newer chunks since the player has played all of them, and continues to attempt playing, as the newer chunks are attempting to get fetched into the playback buffer.

Since the play rate, i.e. the number of video chunks played by the player per unit time, is a constant, and since the total playtime increases constantly over time, as long as there is no manual interruption by the user, $C_N$ can be determined by the network. And from the network data, the network can use the exemplary methodology describe above to estimate the video playback buffer length over time in order to detect video buffering at the player. Along with this, the length of the video buffering can also be estimated, since the buffering event for any chunk Q persists as long as $C_Q \geq T_Q$.

Figure 2A:
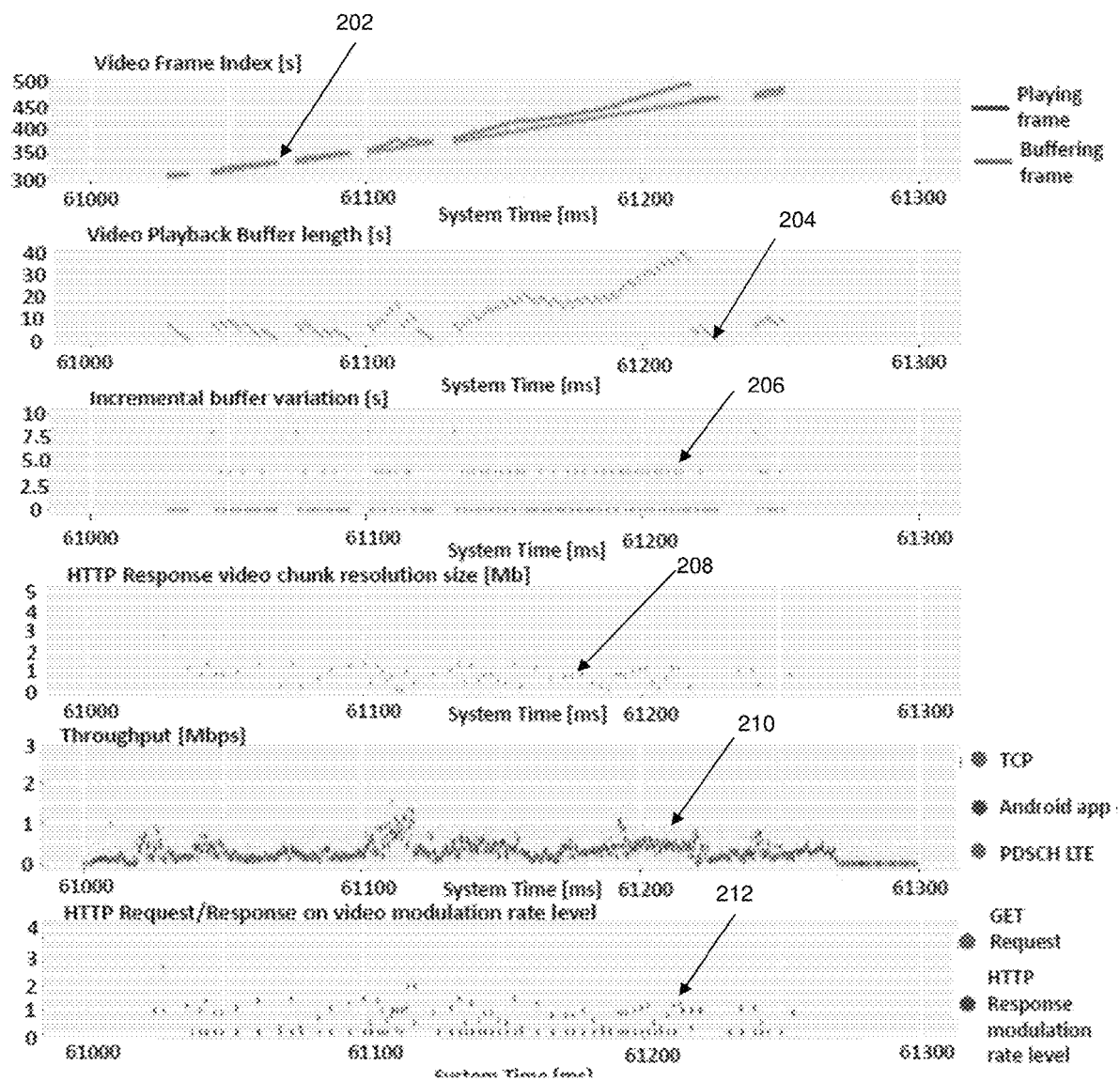
FIGS. 2A and 2B depict an illustrative testing and measurement of network system 100.
Figure 2B:
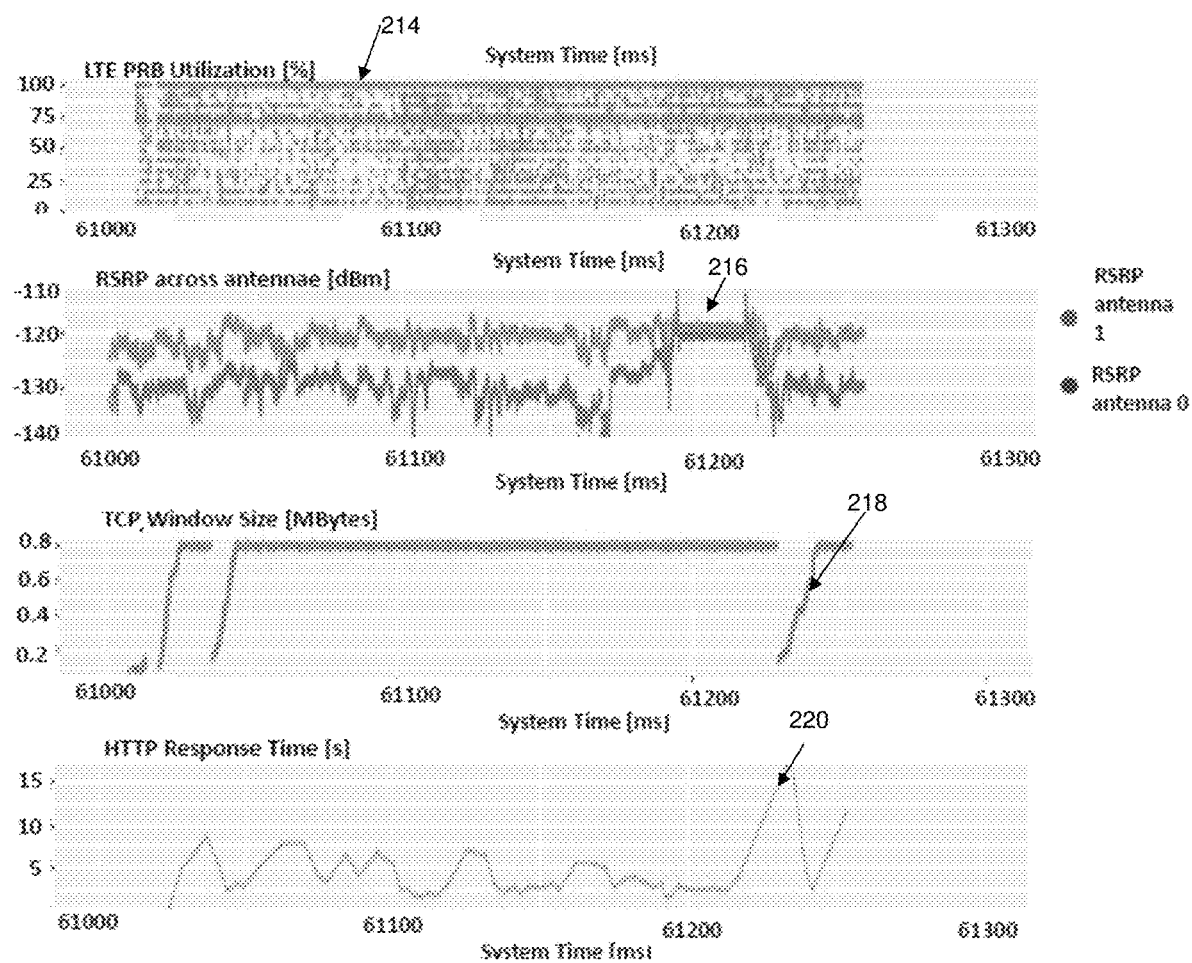

FIGS. 2A and 2B illustrate an exemplary illustrations 200 and 250 of the operation of system 100. FIGS. 2A and 2B illustrates an exemplary media viewing session along with the effects of various characterizations of cross-layer network KPIs, which are the factors that can impact a video playback buffer at a media processor, or a UE 120 video player application, conducting a video-on-demand or OTT media content viewing session. FIGS. 2A and 2B exemplarily illustrate test results in which several video on demand sessions were measured where a total of 9 cell phones were associated to a cell. In the tests, the cell phones were running full-buffer data streaming from a remote IP server.

In portion 202 of FIG. 2A, two non-decreasing quantities are illustrated: video play length and the playback buffer length across system time in units of seconds. The video play length exemplarily indicates the current time of the video content played by the player, and the playback buffer length across system time exemplarily indicates a length of time of the video content streamed and is available in the video playback buffer. The video playtime keeps increasing as the video is being played. The playback buffer length keeps increasing whenever a new video chunk is streamed into the buffer. The playback buffer length does not increase while the chunk download is in progress. The condition when the two quantities are the same indicates the beginning of a buffering event. The buffering event may last until the playback buffer has sufficient newer chunks streamed into it to resume playing. The gaps in portion 202 indicate a persistence of buffering events. In some OTT or video-on-demand systems, two video chunks (worth 8 seconds of content length) is required to be streamed into the buffer to start/resume playing.

Portion 204 of FIG. 2A illustrates an exemplary residual length of content in the video playback buffer that is yet-to-be-played. This quantity is the difference between the two quantities shown in portion 202. This quantity decreases when the video chunk download is in progress, and keeps continuously decreasing when the video chunk download happens slower than the video play. When this quantity becomes 0, it indicates the beginning of a video buffering event, indicating that the buffer is running out of content, even as the player attempts to continue playing the video session. This signals poorer network conditions.

The factors that contribute to the reduction in the playback buffer length, causing the buffer to quickly run out of the streamed video chunks, are thereby characterized. Portions 202 and 204 illustrate the cumulative nature of the video playback buffer, as the buffer accumulates newer yet-to-be-played content over time and removing the chunks played by the player. Exemplarily, the decrease in playback buffer size can be linear as long as there is no buffering or manual interruption from the user, such as a pause or other trick-play event. The increase in the buffer size, caused by accumulation of newer requested chunks at varying rates, is, however, non-linear, as illustrated in portions 202 and 204.

Portion 206 of FIG. 2A exemplarily indicates an incremental, per-second variation in the buffer length across time. A step value of 0 indicates that a video chunk download into the playback buffer is still in progress. Non-zero values indicate chunk downloads. Higher values indicate downloads of multiple video chunks within, for example, a 1 second time frame.

Portion 208 of FIG. 2A exemplarily illustrates the bit-rate of the video chunks when the UE 120 video player application gets a response for the requested video chunks using HTTP. Portion 208 of FIG. 2 exemplarily quantifies the HTTP response "goodput". A higher goodput indicates higher download rates, which means that (i) the streamed video chunks belong to a higher quality, or (ii) a larger number of video chunks (of any quality) are downloaded within shorter time frames (in this case, within 1 second), (iii) or both. Consistently high HTTP goodputs indicate good network conditions.

Portion 210 of FIG. 2A exemplarily illustrates IP-layer and LTE RAN throughputs. The regions with lower throughputs correlate with (i) time periods that experience buffering as seen in portion 202, (ii) time periods that experience decreasing residual buffer length in the portion 204, (iii) smaller step values in portion 206, and (iv) lower HTTP response goodputs in the portion 208. However, if the available playback buffer is large, lower throughputs may not necessarily result in immediate buffering.

Portion 212 of FIG. 2A exemplarily illustrates a variation in the resolution levels of the video chunks requested by the UE 120 player across time. A higher chunk level is requested during periods of higher throughputs seen from portion 210 and when the residual playback buffer is longer, as illustrated in portions 202 and 204. Note that higher resolution video chunks translate to higher payload sizes (bytes). This could result in longer HTTP response times, particularly when the network conditions are poor, thereby causing reduced video playback buffer lengths. The HTTP response goodput in portion 212, adjacent to the corresponding HTTP requests, is the same one shown in portion 208.

Exemplarily, portions 214 and 216 of FIG. 2B can illustrate the number of spectrum resources allocated for the UE 120 player and the reference signal received power (RSRP) values across the two antennae of the UE 120. Lower RSRP values indicate poor RF conditions, which could potentially result in lower throughputs for the UE 120. However, the throughput also depends on a number of spectrum resources allocated to the UE 120, which, in turn, depends on the user and traffic load in the cell.

Portion 218 of FIG. 2B illustrates a TCP Receive Window (RWIN) advertised by the UE 120 that impacts the TCP congestion control and flow control from the video server 170, and accordingly sets the TCP congestion window (cwnd) at the video server 170. Usually, the TCP RWIN and the TCP cwnd are set the same values to maximize the TCP flow. A drop in TCP RWIN correlates with a higher HTTP response time seen in portion 208 of FIG. 2A. This indicates that the TCP packets from the video server 170 to the UE 120 gets dropped at the eNB due to higher congestion at the eNB. A higher congestion can be further caused by packet loss in the network, resulting in continuous re-transmissions. Along with newer incoming packets, the packets to be re-transmitted fill up the buffer queue, eventually causing overflow, when the lossiness in the network persists. This results in congestion, requiring the video server 170 to reduce its congestion window.

Portion 220 of FIG. 2B exemplarily illustrates a difference between the HTTP request and response times. This quantity becomes high when (i) the RAN throughput becomes low, (ii) when the network faces congestion at the eNB, resulting in packet drops and subsequently reducing the congestion window, or (iii) when the requested video chunks correspond to higher resolutions.

Figure 3:
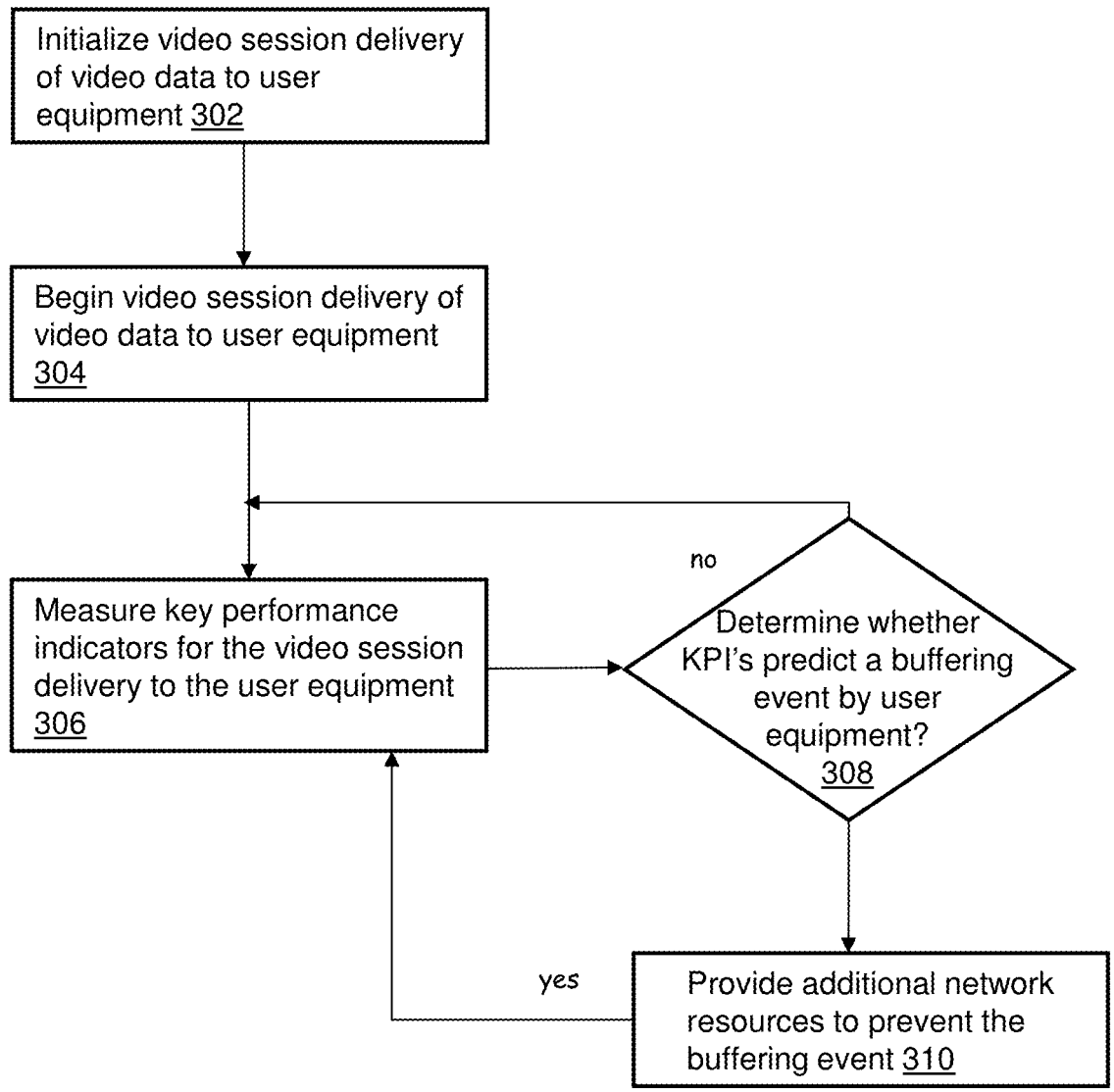
FIG. 3 depicts an illustrative embodiment of a method used in portions of the system described in FIG. 1.

FIG. 3 depicts an illustrative embodiment of a method 300 used by system 100 of FIG. 1. Exemplarily, on a server side of a video-on-demand system or an over-the-top video delivery service, a media streaming session can be initialized in Step 302. Exemplarily, in the media streaming session, a UE 120 media player requests media content from the video server 170 and the video server 170 begins providing the media content to the user equipment 120 in Step 304.

After the media content viewing session has begun in Step 304, the system can monitor the various exemplary key performance indicators (KPI's), on the server side, to exemplarily predict whether a buffering event may occur at the user equipment player in step 306. Exemplarily, the KPI's can include a requested quality for a video chunk requested by the user equipment, a transmission control protocol congestion window size that corresponds to the video chunk requested by the user equipment, and an instantaneous radio access network throughput while downloading the video chunk requested by the user equipment. The KPI's can also include one or more of a video playback length, a playback buffer length, a residual length of content in the video playback buffer, a length of time for a video frame, and a time for the TCP window size to be transmitted through the network to the user equipment at a network transmission speed.

In step 308, it is determined whether the monitored KPI's indicate a likely buffering event. Exemplarily, the monitoring is continuous, and if no buffering event is predicted, method 300 can return to step 306 to monitor the network conditions. On the other hand, if step 308 predicts a likely buffering event, method 300 can proceed to step 310 at which the network can attempt to prevent the buffering event. Exemplarily, after step 310, method 300 can return to step 306 to continue monitoring the video session.

Exemplarily, the network can attempt to prevent the buffering event by assigning additional network resources to the media streaming session. In some embodiments, the network can attempt to prevent the buffering event by providing additional bandwidth for the media streaming session. In other embodiments, the network can choose between different servers or network nodes from which the content for the media streaming session is to be provided to the user equipment so as to increase the efficiency, download speed, or to avoid poorly performing network portions in providing the content for the media streaming session.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
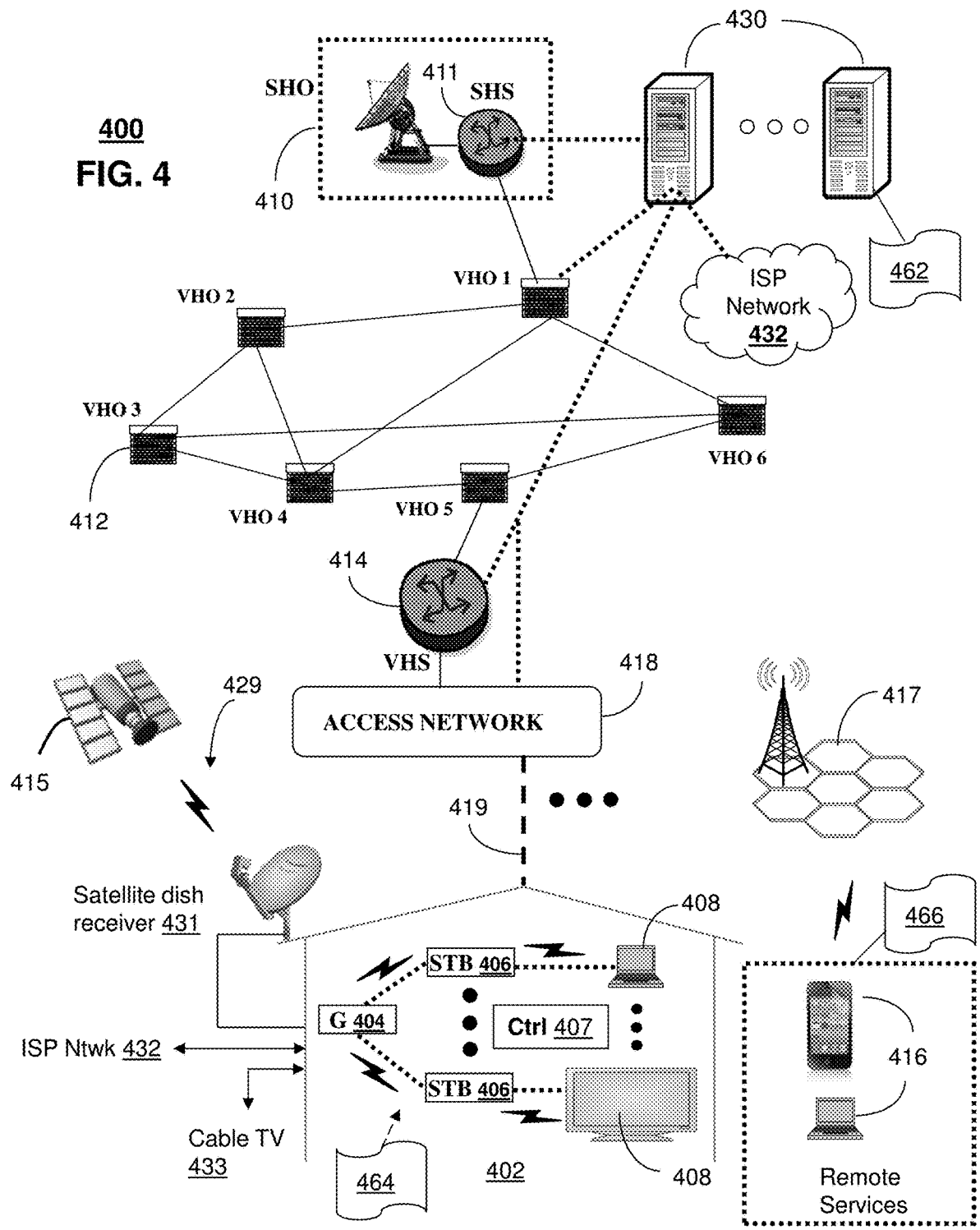
FIG. 4 depict illustrative embodiments of communication systems that provide media services of FIG. 1.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with network architecture 100 of FIG. 1 as another representative embodiment of communication system 400. For instance, one or more devices illustrated in the communication system 400 of FIG. 4 can perform a method including monitoring an over-the-top video session to determine key performance indicators for cross-layer interactions between a network providing over-the-top video session video data and user equipment receiving the over-the-top video session video data, wherein the key performance indicators include a requested quality for a video chunk requested by the user equipment, a transmission control protocol congestion window size that corresponds to the video chunk requested by the user equipment, and an instantaneous radio access network throughput while downloading the video chunk requested by the user equipment, and determining a quality of service for the user equipment during the over-the-top video session according to a residual length of content in a playback buffer for the user equipment based on the requested quality for the video chunk requested by the user equipment, the transmission control protocol congestion window size, and the instantaneous radio access network throughput.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a network monitor (herein referred to as network monitor 430). The network monitor 430 can use computing and communication technology to perform modifications of video delivery service, which can include among other things, the techniques of method 300 in FIG. 3. For instance, monitoring 462 of network monitor 430 can be similar to the functions described for video delivery services as described in method 300 for, in one example, the video server 170 of FIG. 1. The media processors 406 and wireless communication devices 416 can be provisioned with software functions 464 and 466, respectively, to utilize the services of network monitor 430. For instance, video presentation functions 464 and 466 of media processors 406 and wireless communication devices 416 can be similar to the functions described for the user equipment 120 of FIG. 1 and method 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
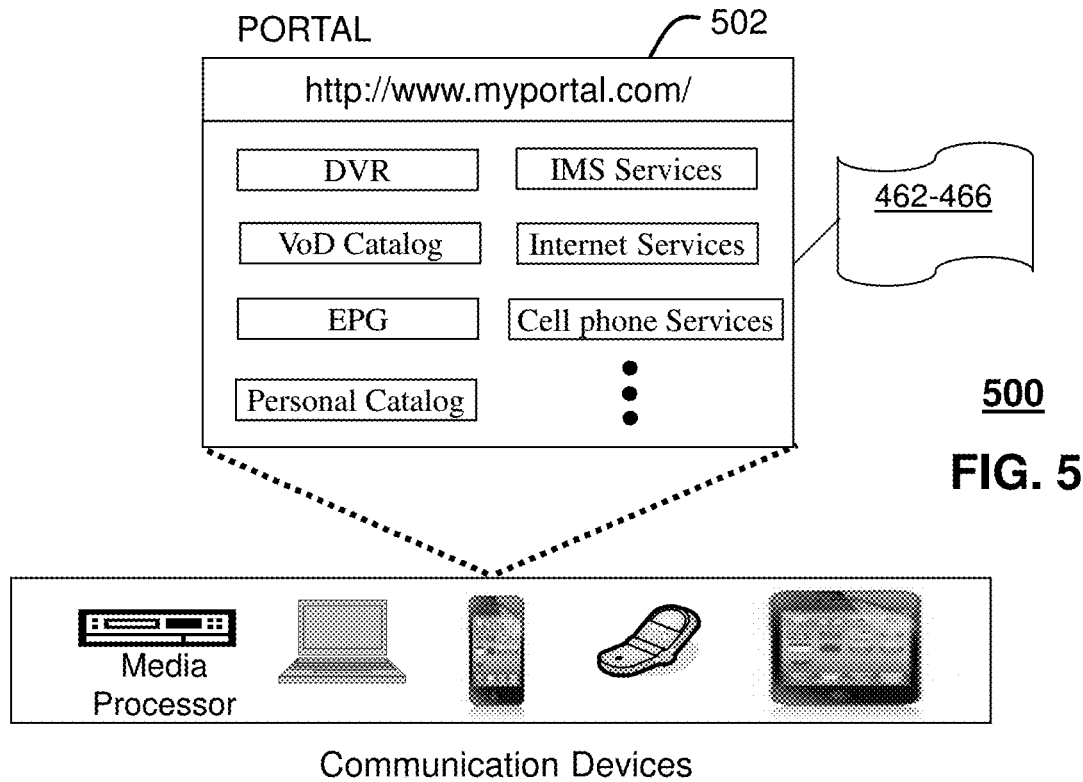
FIG. 5 depicts an illustrative embodiment of a web portal for interacting with the communication systems of to the media systems of FIGS. 1 and 4.

FIG. 5 depicts an illustrative embodiment of a web portal 502 of a communication system 500. Communication system 500 can be overlaid or operably coupled with user equipment 120 of FIG. 1 and communication system 400 as another representative embodiment of system 100 of FIG. 1 and communication system 400. The web portal 502 can be used for managing services of user equipment 120 and video server 170 of FIG. 1 and communication systems 400. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of video servers 170 and user equipment 120 of FIG. 1 and communication system 400. For instance, the operators of network monitor 430 can log into their on-line accounts and provision the video server 170 or server 430 with exemplary features to monitor key performance indicators so as to determine buffering events that may occur on user equipment during a video session, and so on. Service providers can log onto an administrator account to provision, monitor and/or maintain the video server 170 and/or server 430.

Figure 6:
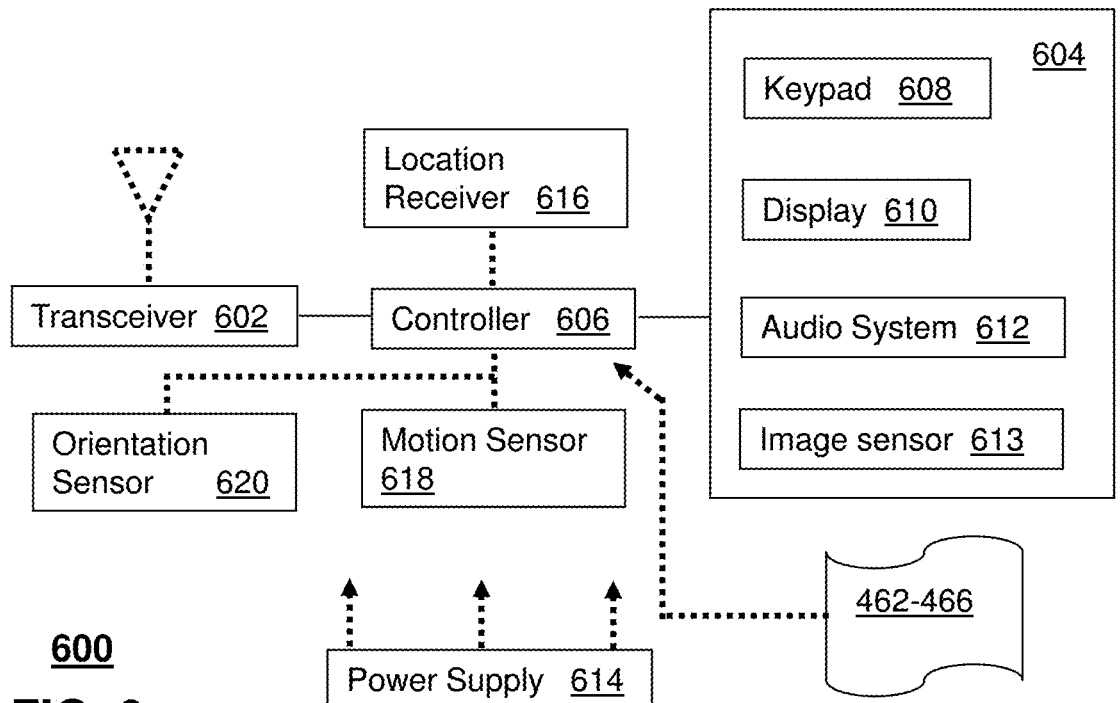
FIG. 6 depicts an illustrative embodiment of a communication device.

FIG. 6 depicts an illustrative embodiment of a communication device 600. Communication device 600 can serve in whole or in part as an illustrative embodiment of the devices depicted in system 100 of FIG. 1 and FIG. 4 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of user equipment 120, the media processor 406, the media devices 408, or the portable communication devices 416 of FIG. 4. It will be appreciated that the communication device 600 can also represent other devices that can operate in system 100 of FIG. 1 as well as communication system 400 of FIG. 4 such as a gaming console and a media player. In addition, the controller 606 can be adapted in various embodiments to perform the functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, other network activities and downloads can be monitored using similar values. In some embodiments, possibilities for buffering in audio or 3-D presentations can be similarly monitored. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
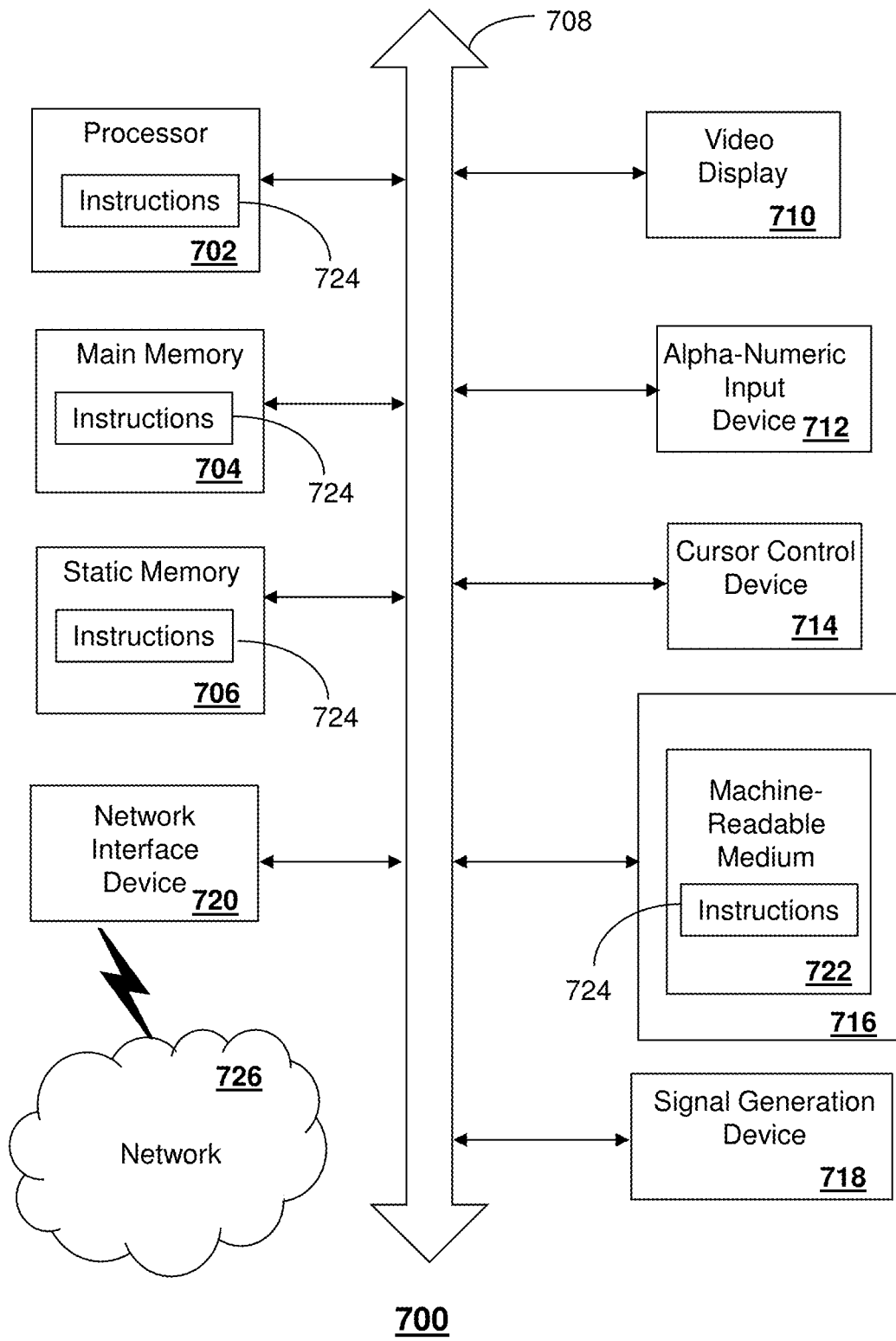
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the network monitor 430, the media processor 406, the video server 170, and the user equipment 120 and other devices of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
monitoring, by a processing system including a processor, indicators for interactions between a network providing video data during a video session and equipment receiving the video data, wherein the indicators include:
a window size that corresponds to a video chunk requested by the equipment, and
a throughput of a download of the video chunk requested by the equipment; and
determining, by the processing system, a quality of service for the equipment during the video session according to a determined residual length of content in a playback buffer for the equipment based on the window size and the throughput.

2. The method of claim 1, further comprising adjusting, by the processing system, network resources for the video session when the quality of service is determined to indicate a probability above a threshold for an occurrence of a buffering event for the equipment.

3. The method of claim 2, wherein the video session comprises an over-the-top video session, and wherein the adjusting of the network resources further comprises allocating additional network resources to transmit additional video chunks to the equipment.

4. The method of claim 3, wherein the adjusting of the network resources further comprises transferring the over-the-top video session to a network server.

5. The method of claim 1, further comprising transmitting, by the processing system, the video chunk requested by the equipment in a present window, wherein a next video chunk is transmitted in a next window responsive to receiving an acknowledgement from the equipment for the video chunk.

6. The method of claim 1, further comprising receiving, by the processing system, a video playtime value from the equipment for the video session, wherein the video session comprises an on-demand video session.

7. The method of claim 1, wherein the quality of service indicates a potential buffering event when the determined residual length of content in the playback buffer nears a zero value.

8. The method of claim 1, wherein the throughput comprises an instantaneous throughput, and wherein the window size comprises a length of individual segments in a time frame corresponding to the video chunk.

9. A non-transitory, machine-readable medium, comprising executable instructions that, when executed by a processing system including a processor, facilitate performance of operations, the operations comprising:
collecting data for a video session to determine indicators for interactions with equipment, wherein the indicators include:
a window size that corresponds to a video chunk requested by the equipment, and
a throughput of a download of the video chunk requested by the equipment; and
determining a quality of service for the equipment during the video session according to a determined residual length of content in a playback buffer for the equipment based on the window size and the throughput.

10. The non-transitory, machine-readable medium of claim 9, wherein the operations further comprise adjusting network resources for the video session when the quality of service is determined to indicate a probability above a threshold for an occurrence of a buffering event for the equipment.

11. The non-transitory, machine-readable medium of claim 10, wherein the adjusting network resources further comprises allocating additional network resources to transmit additional video chunks to the equipment.

12. The non-transitory, machine-readable medium of claim 10, wherein the adjusting network resources further comprises transferring the video session to a network server.

13. The non-transitory, machine-readable medium of claim 9, wherein the operations further comprise:
transmitting the video chunk requested by the equipment in a present window; and transmitting a next video chunk in a next window responsive to receiving an acknowledgement from the equipment for the video chunk.

14. The non-transitory, machine-readable medium of claim 9, wherein the determining the quality of service for the equipment during the video session comprises estimating a playback buffer length at the equipment, wherein the quality of service indicates a potential buffering event when the playback buffer length nears a zero value.

15. The non-transitory, machine-readable medium of claim 9, wherein the window size comprises a length of individual segments in a time frame corresponding to the video chunk, and wherein the video session comprises one of an on-demand video session or an over-the-top video session.

16. A device, comprising:

a processing system including a processor; and a memory that stores executable instructions that, when executed by the processing system, facilitate performance of operations, the operations comprising:

requesting a video session from a network server; and initiating playback of video data for the video session responsive to receiving the video data for the video session from the network server, wherein indicators are collected for interactions for the video session with the device to manage performance to prevent a buffering event at the device, wherein the indicators include:

a window size that corresponds to a video chunk requested by the device, and a throughput of a download of the video chunk requested, a quality of service being determined for the device during the video session according to an estimated residual length of content in a playback buffer for the device based on the window size and the throughput.

17. The device of claim 16, wherein network resources for the video session are adjusted responsive to the quality of service for the device indicating a probability above a threshold for an occurrence of a buffering event for the device.

18. The device of claim 17, wherein additional network resources are allocated to transmit additional video chunks to the device to adjust the network resources.

19. The device of claim 17, wherein the video session is transferred to another network server to facilitate adjustment of the network resources.

20. The device of claim 16, wherein the quality of service indicates a potential buffering event when the estimated residual length of content in the playback buffer nears a zero value.

* * * * *